United States Patent [19]

McCoy

[11] Patent Number: 4,664,395

[45] Date of Patent: May 12, 1987

[54] MULTI-PURPOSE UNIAXIAL LITTER ENGINERY OR M.U.L.E.

[76] Inventor: Melvin McCoy, 4197 Buford Ellington N., Memphis, Tenn. 38111

[21] Appl. No.: 783,385

[22] Filed: Oct. 3, 1985

[51] Int. Cl.$^4$ ............................................. B62D 51/04
[52] U.S. Cl. ..................................... 280/1.5; 224/153;
280/47.32; 280/78; 280/763.1
[58] Field of Search .................... 280/47.32, 47.3, 1.5, 280/652, 30, 78, 763.1; 224/151, 153, 211, 262; 188/31, 69

[56] References Cited

U.S. PATENT DOCUMENTS

| | | | |
|---|---|---|---|
| 2,401,986 | 6/1946 | Talbott | 280/41 |
| 2,613,953 | 10/1952 | Glovannoni | 280/1.5 |
| 2,655,957 | 10/1953 | Lagant | 280/47.3 |
| 3,055,449 | 9/1962 | Murphy | 280/47.3 |
| 3,144,014 | 8/1964 | Mantell, Jr. | 126/38 |
| 3,550,997 | 12/1970 | Strand | 280/30 |
| 4,040,548 | 8/1977 | Guglielmo | 224/262 |
| 4,045,040 | 8/1977 | Fails | 280/1.5 |
| 4,084,663 | 4/1978 | Haley | 188/31 |
| 4,171,139 | 10/1979 | Cockram | 280/652 |
| 4,307,826 | 12/1981 | Stewart | 224/211 |
| 4,318,502 | 3/1982 | Lowe et al. | 224/153 |
| 4,431,121 | 2/1984 | Bensette | 280/1.5 |

FOREIGN PATENT DOCUMENTS

| | | | |
|---|---|---|---|
| 298324 | 4/1916 | Fed. Rep. of Germany | 224/153 |
| 1604449 | 12/1981 | United Kingdom | 224/153 |

*Primary Examiner*—David M. Mitchell
*Attorney, Agent, or Firm*—Henderson & Sturm

[57] ABSTRACT

A user propelled wheeled mule assembly (10) comprising a harness unit (11) attached to a user worn frame unit (12) which is pivotally attached to an elongated load bearing frame unit (13) having a retractable support unit (14) and a wheel unit (15); wherein the retractable support unit (14) allows the assembly (10) to be deployed in a stand alone walk-into, or walk-out-of mode, and the assembly (10) is further provided with independent first and second brake (17) (18) and brake actuating (19) (20) units, wherein variable braking is applied to the assembly (10) while in motion, and positive braking is applied to the assembly (10) in the stand alone mode.

10 Claims, 10 Drawing Figures

/ 1

MULTI-PURPOSE UNIAXIAL LITTER ENGINERY OR M.U.L.E.

TECHNICAL FIELD

The present invention relates generally to the area of body attached wheeled load carriers.

BACKGROUND OF THE INVENTION

The prior art is replete with single and multiple wheeled body attached load carriers as can be seen by reference to the following U.S. Pat. Nos. 3,550,997; 4,171,139; 2,401,986; 3,144,014; British Pat. No. 1,604,449 and German Pat. No. 298,324.

The above cited prior art share many structural similarities; in that they all disclose a wheeled tubular framework associated or attached to a portion of the users anatomy. In addition, all of these devices are designed to accomplish the same function, which is the extended capability of the user to travel greater distances carrying more weight than would be possible in the absence of mechanical assistance.

It should not come as a surprise therefore that the subject matter of the present invention also incorporates some of the more basic structural components of the prior art devices in its own unique construction. What is surprising about the present invention is the fact that the prior art is so relatively crowded and to date no one has employed an integrated assembly approach to this area of technology and produced a "mule" or user propelled wheeled load carrier having the features found in the present invention.

Even though the prior art involves a well recognized basic principal and technology; the structures represented in the patent literature are deficient in a number of respects, that they share both individually and in common with one another.

The most common shared deficiencies in the prior art devices are: lack of stability; inadequate load capacities; absence of brake mechanisms; lack of stand alone capability; manually assisted lateral maneuvering requirements; high profiles when the user is in a prone position; and, mid-body user contact.

BRIEF SUMMARY OF THE INVENTION

The present invention virtually eliminates all of the drawbacks encountered with the known prior art constructions, by virtue of its integrated design into a complete independent assembly.

The present invention involves a user propelled wheeled load carrier or "mule" comprising a harness unit; a user worn frame unit; an elongated load bearing frame unit, a retractable support unit; a wheel unit; and, a plurality of brake and brake actuating units which are combined into an integrated assembly.

The harness is attached to the user worn frame unit and operatively connected to one of the brake units via a harness attached brake actuating unit. The elongated load bearing frame unit is pivotally attached on one end to the user worn frame unit and provided on its other end with the wheel unit. The wheel unit is further provided with the plurality of brake units and at least one brake actuating unit; and, the elongated load bearing unit is further provided with the retractable support unit, which acts in concert with one of the brake and brake actuating units to allow the assembly to be disposed in an unattended stand alone mode, regardless of the steepness of the terrain in which the assembly is employed.

BRIEF DESCRIPTION OF THE DRAWINGS

These and other objects, advantages, and novel features of the invention will become apparent from the detailed description of the best mode for carrying out the invention which follows, particularly when considered in conjunction with the accompanying drawings wherein.

BEST MODE FOR CARRYING OUT THE INVENTION

Figure 1:
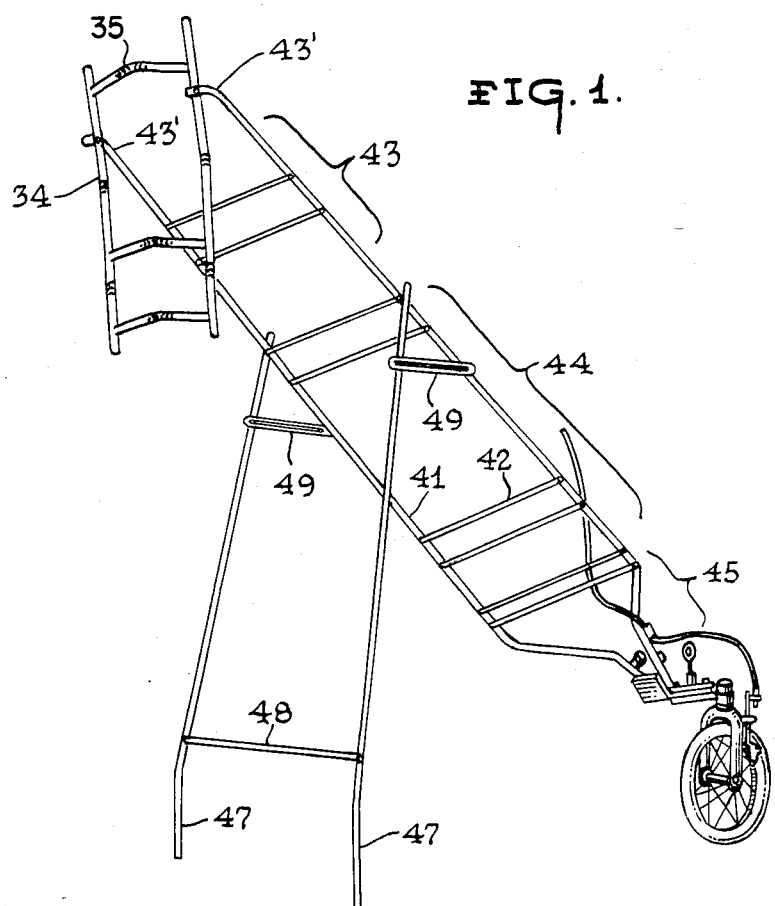
FIG. 1 is a perspective view of the integrated assembly in the stand alone mode.
Figure 10:
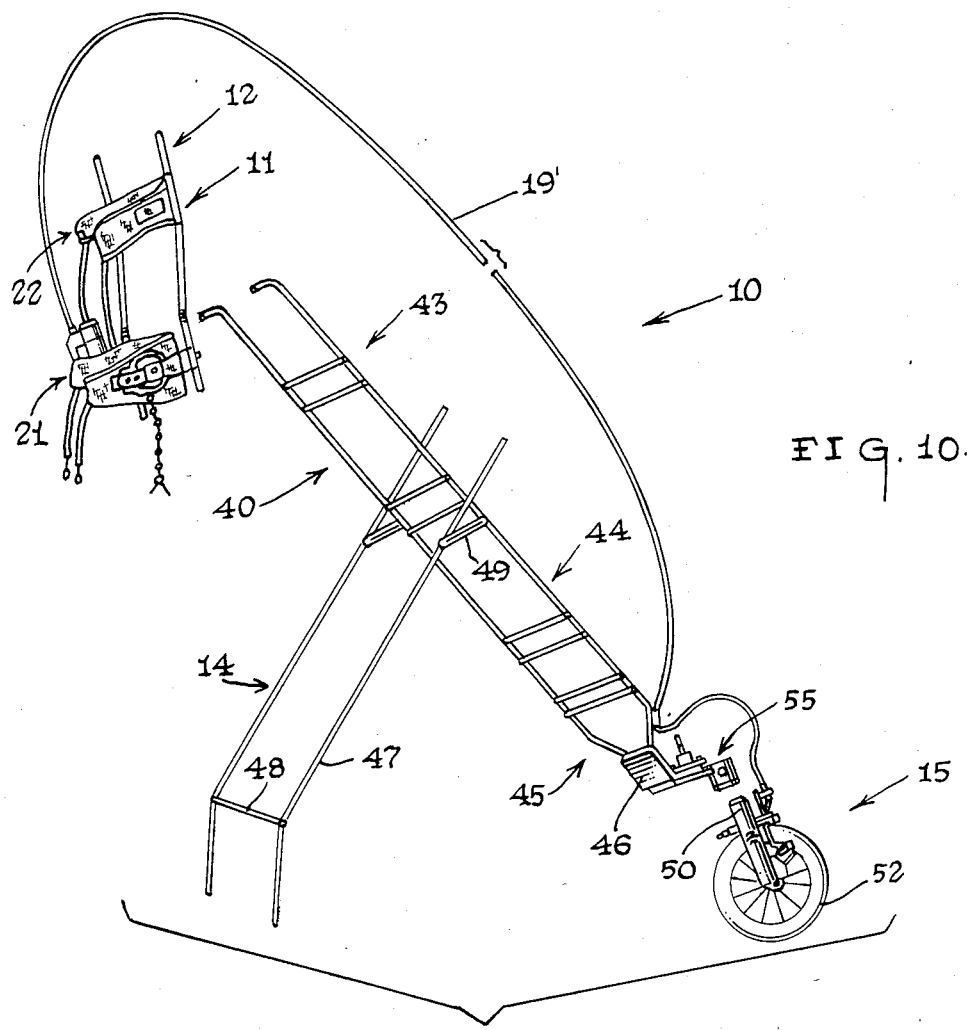
Figure 8:
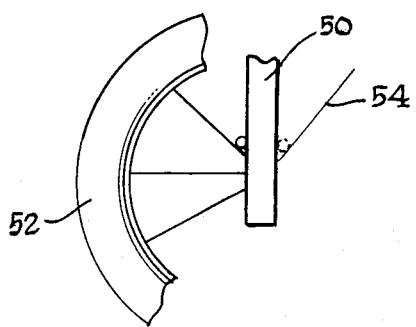
FIG. 8 is a detail view of one of the brake units in its actuated disposition.
Figure 9:
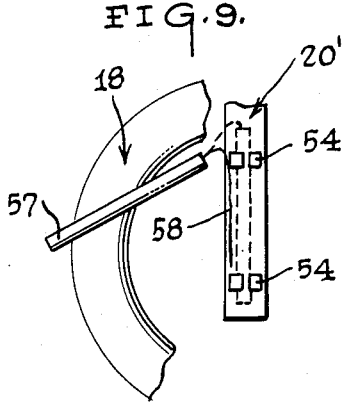
FIG. 9 is a detail view of the brake unit of FIG. 8 in its retracted disposition; and, FIG. 10 is an exploded perspective view of the components of the integrated assembly.

As can be seen by reference to FIGS. 1 and 10 the user propelled wheeled load carrier of the instant invention comprises an integrated assembly designated generally by the reference numeral (10). The integrated assembly (10) comprises: a harness unit (11); a user worn frame unit (12); an elongated load bearing frame unit (13); a retractable support unit (14); a wheel unit (15); and, a plurality of brakes (17, 18) and brake actuating (19, 20) units.

Figure 2:
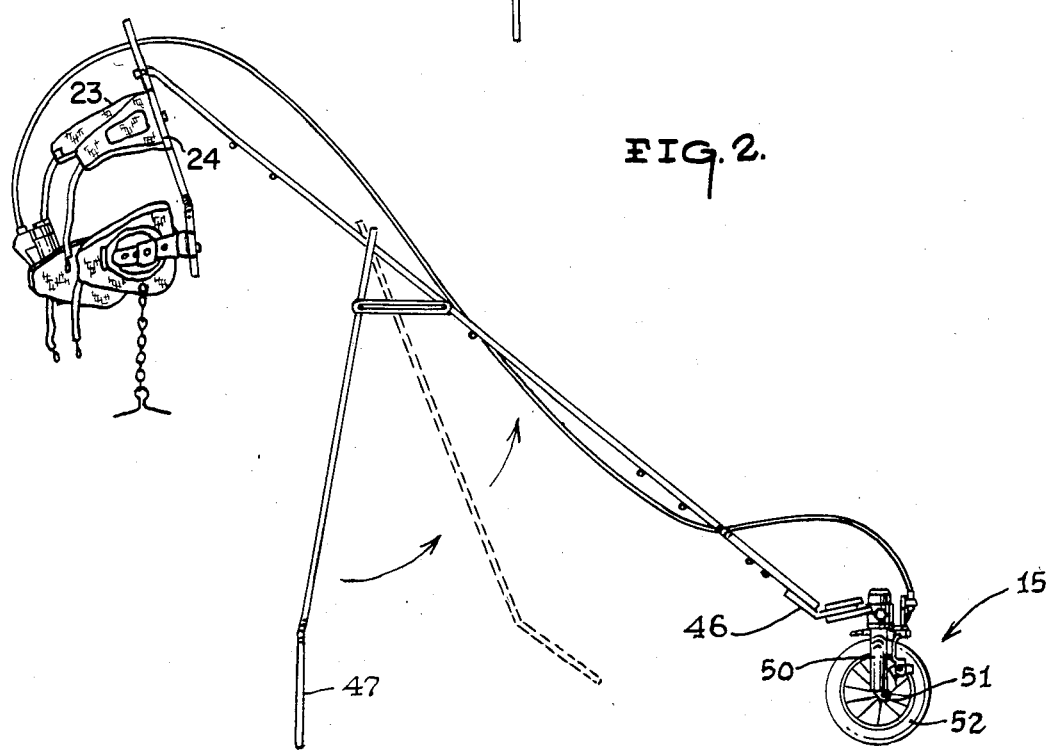
FIG. 2 is a side elevation of the assembly in the stand alone mode.
Figure 3:
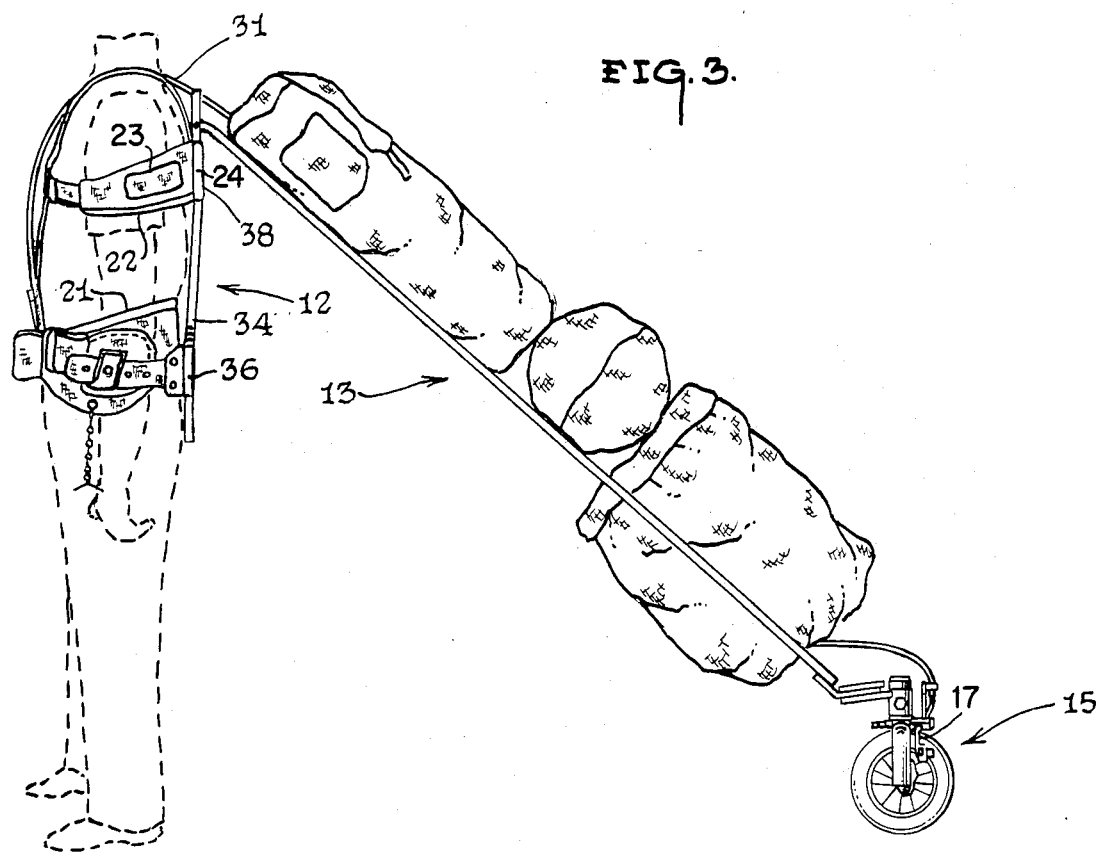
FIG. 3 is a side elevation view of the assembly being worn by a user.
Figure 4:
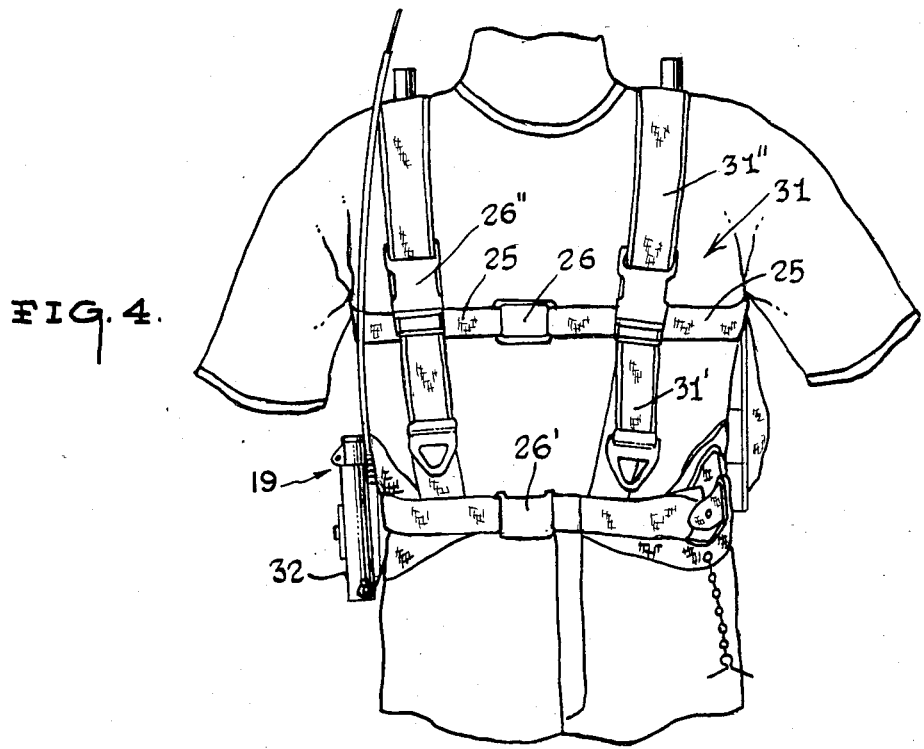
FIG. 4 is a front elevation of the harness unit.

As best depicted in FIGS. 2 thru 4 the harness unit (11) comprises a waist encircling member (21) and chest encircling member (22) which are operatively connected both to the users torso and to the user worn frame unit (12) in a manner that will be described shortly. The chest encircling member (22) comprises a first contoured webbing element (23) having rearwardly disposed frame engaging portions (24) and a pair of chest encircling arm members (25) provided with cooperating releasable securing means (26) disposed on their outboard ends.

The waist encircling member (21) comprises a second contoured webbing element (27) having two outboard ends, wherein the second webbing element (27) completely encircles the users waist, and is provided with cooperating releasable securing means (26') disposed on the outboard ends, and belt receiving loops (28) disposed on reinforced side panels (29) affixed to the padded hip portions (30) which are formed integrally with the waist encircling member (21).

Figure 5:
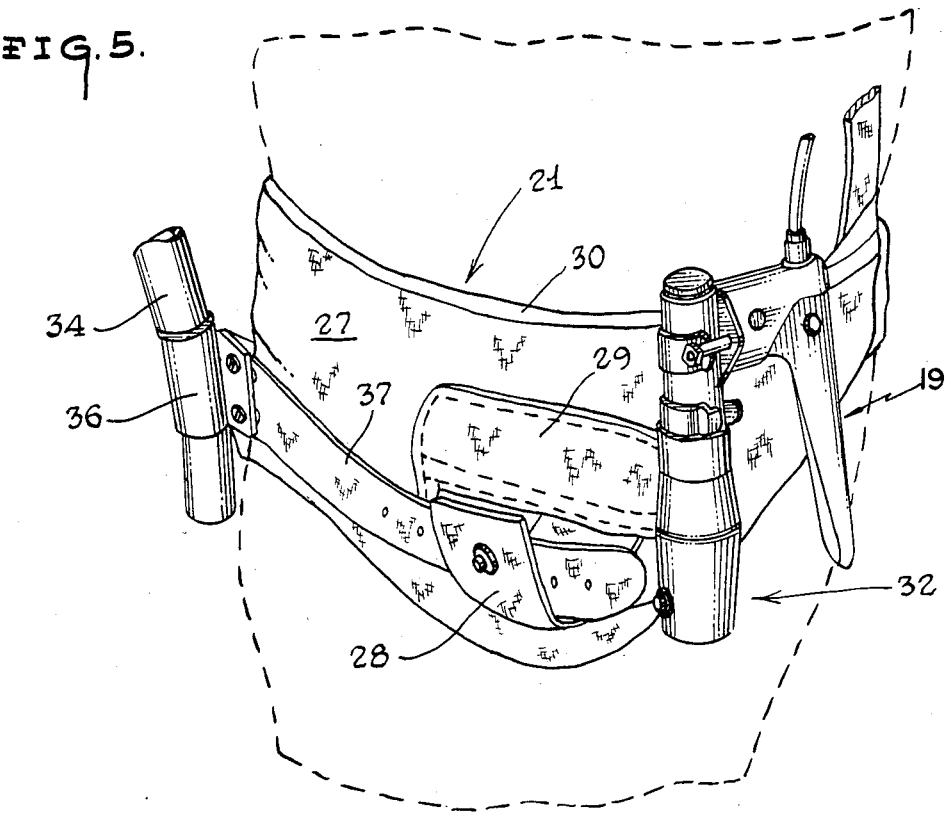
FIG. 5 is detail view of the harness unit and one of the brake actuating units.

It should be noted at this juncture that the waist encircling member (21) chosen for use in the integrated assembly (10) and depicted in FIG. 5 is quite similar in construction to a waist suspension system currently marketed by JANSPORT, and slightly modified and adapted for use with the present assembly, by the addition of a holster member (32) which will be described shortly.

In addition to the above recited structure the waist encircling member (21) is further provided with the lower portion (31') a strap assembly (31) connected to, but spaced from, the outboard ends of the waist encircling member (21) and a holster member (32) adapted to releasably secure one of the brake actuating units (19).

The user worn frame unit (12) comprises a generally rectangular framework (33) having a pair of vertical tubular members (34) connected together by a plurality of spaced horizontal tubular members (35) which form the framework (33).

In addition, the user worn frame unit (12) is further provided with the upper portion (31") of the strap assembly (31), wherein the strap assembly (31) operatively connects the user worn framework (33) to both the waist encircling member (21) and the chest encircling member (22) in a manner to be described shortly. The user worn frame unit (12) is also provided with bracket members (36) on the lower portion of the respective vertical tubular members (34), and the bracket members (36) are further provided with belt segments (37), which are adapted to cooperate with the belt receiving loops (28) on the waist encircling member (21) to releasably secure the lower portion of the frame unit (12) to the sides of the waist encircling member (21) in a well recognized fashion.

As can best be seen by reference to FIGS. 2 and 3, the rear portion of the chest encircling member (22) is secured to, and stretched across, the upper portion of the user worn framework (33). In the drawings this connection is depicted as elongated cylindrical pockets (38) formed on the rear surface of the chest encircling contoured webbing (23), which frictionally engage the vertical tubular members (34) of the user worn framework (33) and are secured thereto by fastening means (39) such as a nut and bolt arrangement, or the like.

As can also be seen by reference to FIG. 3, the upper portion (31") of the harness strap assembly (31) is fixedly secured on one end to the top horizontal tubular member (35) of the user worn framework (33), and provided on its free ends with releasable securing means (26") which cooperate with complementary securing means on the lower portion (31') of the strap assembly (31).

As can best be seen by reference to FIGS. 1 and 10, the load bearing frame unit (13) comprises an elongated generally rectangular segmented framework (40), wherein each segment is provided with a pair of elongated vertical tubular members (41) and a plurality of horizontal tubular members (42). While the elongated framework (40) of the preferred embodiment has best been referred to as segmented; it should be appreciated that this structural component may also be formed as a one piece integral unit, in keeping with the teachings of this invention.

The upper segment (43) of the load bearing framework has a generally H-shaped configuration; while the intermediate segment (44) has a generally rectangular configuration; and, the lower segment (45) has a generally V-shaped configuration, and suitable coupling means (not shown) are provided to join the respective segments (43, 44, 45) together to form the elongated load bearing framework (40).

As can be seen in FIG. 1, the top of the upper H-shaped segment (43) has inwardly bent arms (43') which are pivotally secured to the upper portion of the user worn frame unit (12). In addition the retractable support unit (14) is operably engaged with the intermediate framework segment (44); and, the free end of the lower framework segment (45) is provided with a wheel assembly mounting bracket (46).

The retractable support unit (14) comprises a pair of elongated tubular legs (47) pivotally secured to the elongated framework (40) proximate the forward end of the intermediate framework segment (44), and provided with at least one tubular cross-piece element (48), which provides lateral stability for the support unit (14) in its deployed mode. The retractable support unit (14) is further provided with slotted brace members (49), which are pivotally secured on one end to the framework (40), and on their other end to the retractable support unit (14).

Figure 6:
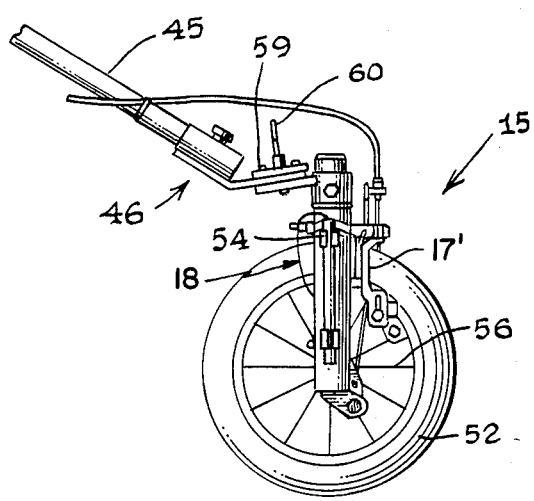
FIG. 6 is a side elevation detail view of the wheel unit and the plurality of brake units.
Figure 7:
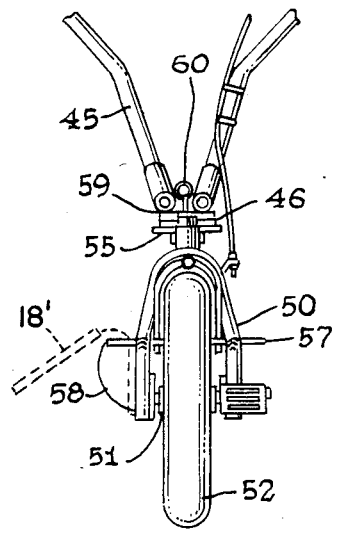
FIG. 7 is a front elevation detail view of the wheel unit and the plurality of brake units.

The wheel unit (15) comprises a forked support bracket (50) which is dimensioned to rotatably receive an axle element (51) operatively associated with a wheel element (52). As shown in FIGS. 6 and 7, the rearward portion of the forked support bracket (50) is provided with a first brake support member; one side of the forked support bracket (50) is provided with a second brake support member (54); and, the forward portion of the forked support bracket is provided with a frame attaching assembly (55).

The first brake support member operatively disposes the first brake unit (17) proximate the wheel element (52); whereby, when the first brake actuating unit (19) is manually manipulated the first brake unit (17) will progressively engage a portion of the wheel element (52) periphery.

In the preferred embodiment illustrated in the drawings the first brake unit (17) and brake actuating unit (19) comprise: a C-style clamping brake member (17'); and, an elongated cable and lever actuating mechanism (19'), such as are employed on racing bicycles. This combination of brake and brake actuating units allows the user to vary the braking pressure applied to the wheel element (52), depending upon the downward gradient or steepness of the terrain in which the mule assembly (10) is employed.

The second brake unit (18) and brake actuating unit (20) comprise a cylindrical wheel chock element (18') and a flexible connector element (20') that is secured on one end to the forked wheel bracket (50) and on its other end to the chock element (18'). In the preferred embodiment depicted in FIG. 6, the chock element (18') is normally retained in the second brake support member (54) while the mule (10) is in motion. Once the mule (10) has been stopped and the retractable support (14) deployed, the chock element (18') is removed from the support member (54) and interposed between the wheel spokes (56) and the forked wheel bracket (50) to immobilize the wheel element, and prevent the mule assembly (10) from rolling downhill.

In the preferred embodiment, the wheel chock element (18') comprises a hollow tubular member (57); and, the flexible connector element (20') comprises a spring wire element (58) which is connected on one end to the forked wheel bracket (50) and on its other end to the hollow tubular member (57). As shown in phantom in FIG. 7, the spring wire element (58) normally biases the hollow tubular member (57) away from engagement with the wheel unit (15) while still retaining a physical loss-proof connection with the mule assembly (10).

Under normal operating conditions the hollow tubular member (57) is either retained in the second brake support member (54) or deployed in its brake mode, by being manually interposed between the wheel spokes (56) and the forked wheel bracket (50).

Under certain emergency conditions; however, it is not only desireable, but imperative that the wheel chock element (18') be capable of instantaneous disengagement. In these circumstances, all that is required is that the hollow tubular member (57) be rapidly removed from between the wheel spokes. This removal is accomplished simply by moving the wheel so that the pressure is released on the hollow tubular member (57), whereby the spring tension in the spring wire element (58) is relieved. Once this has been accomplished the hollow tubular member (57) will assume the position shown in phantom in FIG. 7.

The operative connection between the wheel assembly mounting bracket (46) and the frame attaching bracket (55) is shown in FIGS. 6 and 7, and comprises an apertured cap element (59) and an elongated threaded adjustment member (60) which extends through the cap member (59) the frame attaching bracket (55) and the wheel assembly mounting bracket (46), to secure and align the wheel unit (15) with respect to the load bearing frame unit (13).

It should be obvious at this juncture that the mule assembly (10) heretofore described was specifically developed with military and recreational applications in mind; however, this integrated assembly would also conceivably find widespread usage in underdeveloped countries as an alternative to beast of burden transport of loads in excess of unassisted human capabilities, particularly in those countries having rugged terrain and a dearth of draft animals.

Some of the more significant aspects of this invention, that have not specifically been set forth previously or emphasized enough, are: a minimum assembly weight to load bearing capacity of 5:1; an extremely low profile when the user assumes a prone position; the walk-into and walk-out-of capabilities afforded by the stand alone mode of deployment; the dual independent brake systems that allow controlled braking in use, and nonvariable fail-safe positive braking on uneven terrain; the quick release and loss proof features of the fail-safe brake; the multiple quick release features found on the harness unit; the improved trailing capabilities produced by the independent user worn frame unit and load bearing unit, which is attributable not only to their individual structural components, but also to the fact that the pivoted connection between these units is disposed adjacent the respective tops of each unit; and, the breakdown capabilities of the load bearing unit, wherein the largest dimensioned individual structural component involved in the assembly is the intermediate segment of the load bearing frame unit and its attached retractabe support unit.

Having thereby described the subject matter of this invention, it should be obvious that many substitutions, modifications, and variations of the mule assembly are possible in light of the above teachings. It is therefore to be understood that the invention as taught and described herein is only to be limited to the extent of the breadth and scope of the appended claims.

I claim:

1. A user propelled wheeled mule assembly comprising:
   a harness unit having a waist encircling member, a chest encircling member, and a pair of strap members attached to both said waist encircling member and said chest encircling member; wherein said chest encircling member comprises: a contoured webbing element fixedly secured to said user worn frame unit, and having a pair of arm members provided with cooperating releasable securing means on their free ends; and, wherein said waist encircling member comprises:
   a contoured webbing element having two ends which intimately surrounds a users waist, and which is provided with padded hip portions, reinforced side panels, belt receiving loops, cooperating releasable securing means associated with the said two ends; and, a first brake actuating unit holster member;
   a user worn frame unit fixedly attached to said chest encircling member and also having a pair of strap members attached to the upper portion of said user worn frame unit, wherein the strap members on said waist encircling member and said user worn frame unit are provided with cooperating releasable securing means;
   an elongated load bearing frame unit having a wheel unit disposed on its lower end and pivotally attached on its upper end to the upper portion of said user worn frame unit;
   a retractable support unit operatively attached to said load bearing frame unit, wherein said retractable unit can be deployed to support the mule assembly in a strand alone mode; and,
   a first and second brake and brake actuating units operatively associated with the wheel unit wherein the first brake and brake actuating unit are provided to apply a variable braking force to the wheel unit and the second brake and brake actuating unit are provided to selectively provide a nonvariable fail safe braking force to the wheel unit when the mule assembly is deployed in the stand alone mode.

2. A mule assembly as in claim 1; wherein said user worn frame unit comprises:
   a pair of vertical tubular members connected together by a plurality of horizontal tubular members, wherein said frame attached pair of strap members are secured to the uppermost horizontal tubular member, and each of the vertical tubular members are further provided with bracket members having belt segments projecting outwardly therefrom; wherein said belt segments are dimensioned to be releasably received in the said belt receiving loops on said waist encircling member.

3. A mule assembly as in claim 2; wherein, the elongated load bearing frame unit comprises:
   an elongated generally rectangular segmented framework comprising: a generally H-shaped upper segment; a generally rectangular intermediate segment; and, a generally V-shaped lower segment; wherein each segment comprises a pair of vertical tubular members and a plurality of horizontal tubular members, and wherein the top of the upper segment has inwardly bent arms which are pivotally secured to the upper portion of the user worn frame unit.

4. A mule assembly as in claim 3; wherein, the retractable support unit comprises:
   a pair of elongated tubular legs, pivotally secured to the said segmented framework proximate the forward end of the intermediate framework segment, and provided with at least one cross-piece element between the elongated tubular legs.

5. A mule assembly as in claim 4; wherein the retractable support unit further comprises:
brace members pivotally secured on one end to the segmented framework and on their other end to the retractable support unit.

6. A mule assembly as in claim 4; wherein the free end of the lower framework segment is provided with a wheel assembly mounting bracket.

7. A mule assembly as in claim 6; wherein the wheel unit comprises:
a forked support bracket having first and second brake support members, and a frame attaching assembly, which operatively connects the wheel unit with the said wheel assembly mounting bracket.

8. A mule assembly as in claim 1; wherein, the first brake and brake actuating unit comprises:
a C-style clamping brake member; and,
an elongated cable and lever actuating mechanism.

9. A mule assembly as in claim 1; wherein, the second brake and brake actuating unit comprises:
a cylindrical wheel chock element; and,
a flexible connector element, secured on one end to the wheel unit, and secured on its other end to the cylindrical wheel chock element.

10. A mule assembly as in claim 7; wherein, the operative connection between the wheel assembly mounting bracket and the frame attaching bracket comprises:
an apertured cap element; and,
an elongated adjustment member which extends through the cap member, the frame attaching bracket and the wheel assembly mounting bracket to secure and align the wheel unit with respect to the load bearing frame unit.

* * * * *